(12) United States Patent
Vander Lind

(10) Patent No.: US 9,352,832 B2
(45) Date of Patent: May 31, 2016

(54) BRIDLES FOR STABILITY OF A POWERED KITE AND A SYSTEM AND METHOD FOR USE OF SAME

(71) Applicant: Google Inc., Mountain View, CA (US)

(72) Inventor: Damon Vander Lind, Alameda, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/338,138

(22) Filed: Jul. 22, 2014

(65) Prior Publication Data

US 2014/0326831 A1    Nov. 6, 2014

Related U.S. Application Data

(63) Continuation-in-part of application No. 13/070,157, filed on Mar. 23, 2011, now Pat. No. 8,800,931.

(60) Provisional application No. 61/341,029, filed on Mar. 24, 2010.

(51) Int. Cl.
*A63H 27/08* (2006.01)
*B64C 31/06* (2006.01)
*A63H 27/00* (2006.01)
*A63H 27/04* (2006.01)

(52) U.S. Cl.
CPC .............. *B64C 31/06* (2013.01); *A63H 27/002* (2013.01); *A63H 27/04* (2013.01); *A63H 27/08* (2013.01)

(58) Field of Classification Search
USPC .......... 244/153 R, 154, 155 R, 155 A, 153 A; 446/30, 31, 32, 33; 290/55
See application file for complete search history.

(56) References Cited

U.S. PATENT DOCUMENTS

| | | | |
|---|---|---|---|
| 3,579,905 A | 5/1971 | Radford et al. | |
| 3,696,558 A | 10/1972 | Mabuchi et al. | |
| 4,067,139 A | 1/1978 | Pinkerton et al. | |
| 4,166,596 A | 9/1979 | Mouton et al. | |
| D255,469 S | 6/1980 | Deptula | |
| 4,486,669 A | 12/1984 | Pugh | |
| 4,659,940 A | 4/1987 | Shepard | |
| 5,056,447 A | 10/1991 | Labrador | |
| 5,145,129 A | 9/1992 | Gebhard | |
| 5,435,259 A | 7/1995 | Labrador | |
| 6,523,781 B2 | 2/2003 | Ragner | |
| 6,781,254 B2 | 8/2004 | Roberts | |
| 6,923,622 B1 * | 8/2005 | Dehlsen | 416/87 |
| 7,093,803 B2 | 8/2006 | Culp | |
| 7,183,663 B2 | 2/2007 | Roberts et al. | |
| 7,188,808 B1 | 3/2007 | Olson | |

(Continued)

OTHER PUBLICATIONS

International Search Report prepared by the U.S. Patent Office in International application Serial No. PCT/US11/29855, mailed Jul. 20, 2011.

(Continued)

*Primary Examiner* — Benjamin P Lee
(74) *Attorney, Agent, or Firm* — McDonnell Boehnen Hulbert & Berghoff LLP

(57) ABSTRACT

The system may include a ground station, a tether attached to a ground station on a first end and to two or more bridles on a second, and a kite. The kite may include a main wing. Each bridle of the two or more bridles may be attached to the main wing, and the two or more bridles may be adapted to provide a torque on the kite to control a roll of the kite.

11 Claims, 15 Drawing Sheets

(56) References Cited

U.S. PATENT DOCUMENTS

| | | | |
|---|---|---|---|
| 7,317,261 | B2 | 1/2008 | Rolt |
| 7,335,000 | B2 | 2/2008 | Ferguson |
| 7,602,077 | B2 | 10/2009 | Ferguson |
| 7,675,189 | B2 | 3/2010 | Grenier |
| 7,775,761 | B2 | 8/2010 | Ferguson |
| 7,859,126 | B2 | 12/2010 | Ferguson |
| 8,109,711 | B2 | 2/2012 | Blumer et al. |
| 8,148,838 | B2 | 4/2012 | Ferguson |
| 8,350,403 | B2 | 1/2013 | Carroll |
| 8,800,931 | B2 | 8/2014 | Vander Lind |
| 9,000,605 | B2 * | 4/2015 | Glass .............................. 290/55 |
| 2004/0075028 | A1 | 4/2004 | Wang |
| 2005/0127240 | A1 | 6/2005 | Culp |
| 2009/0292407 | A1 | 11/2009 | Minelli et al. |
| 2010/0013226 | A1 | 1/2010 | Blumer et al. |
| 2010/0026007 | A1 | 2/2010 | Bevirt |
| 2010/0032947 | A1 | 2/2010 | Bevirt |
| 2010/0032948 | A1 | 2/2010 | Bevirt |
| 2010/0221112 | A1 | 9/2010 | Bevirt et al. |
| 2010/0230546 | A1 | 9/2010 | Bevirt et al. |
| 2010/0230547 | A1 | 9/2010 | Tayman |
| 2010/0283253 | A1 | 11/2010 | Bevirt |
| 2010/0295320 | A1 | 11/2010 | Bevirt et al. |
| 2010/0295321 | A1 | 11/2010 | Bevirt |
| 2010/0308174 | A1 | 12/2010 | Calverley |
| 2011/0042508 | A1 | 2/2011 | Bevirt et al. |
| 2011/0042509 | A1 | 2/2011 | Bevirt et al. |
| 2011/0042510 | A1 | 2/2011 | Bevirt et al. |
| 2011/0121570 | A1 | 5/2011 | Bevirt et al. |
| 2011/0127775 | A1 | 6/2011 | Bevirt et al. |
| 2011/0186687 | A1 | 8/2011 | Elder |
| 2011/0260462 | A1 | 10/2011 | Vander Lind |
| 2011/0266395 | A1 | 11/2011 | Bevirt |
| 2011/0266809 | A1 | 11/2011 | Calverley |
| 2011/0272527 | A1 | 11/2011 | Larson |
| 2012/0104763 | A1 | 5/2012 | Vander Lind |
| 2012/0112008 | A1 | 5/2012 | Holifield et al. |
| 2013/0221679 | A1 * | 8/2013 | Vander Lind .................. 290/55 |

OTHER PUBLICATIONS

Supplementary European Search Report prepared by the European Patent Office in application No. EP 11 76 0250, completed Sep. 8, 2014.

"Autonomous Airborne Wind Power" Recorded Web Video [online], Makani, YouTube, May 13, 2013. [Retrieved on Sep. 8, 2015] from Internet: https://www.youtube.com/watch?v=hbPXXpaW5ws&list=UU-iMZJ8NppwT2fLwzFWJKOQ.

"Airborne Wind Turbine Flight Demonstrations" Recorded Web Video [online], Makani, YouTube, May 4, 2012. [Retrieved on Sep. 8, 2015] from Internet: https://www.youtube.com/watch?v=ww_Y10sVboU&list=UU-iMZJ8NppwT2fLwzFWJKOQ.

"Autonomous Transition to Hover" Recorded Web Video [online], Makani, YouTube, Dec. 20, 2011. [Retrieved on Sep. 8, 2015] from Internet: https://www.youtube.com/watch?v=EU4ayk6QRyE&list=UU-iMZJ8NppwT2fLwzFWJKOQ.

"Makani Power Autonomous Flight. Jun. 18, 2010—HD" Recorded Web Video [online], Makani, YouTube, Jul. 19, 2010. [Retrieved on Sep. 8, 2015] from Internet:https://www.youtube.com/watch?v=IH-GpeXC5Jk&list=UU-iMZJ8NppwT2fLwzFWJKOQ.

* cited by examiner

BRIDLES FOR STABILITY OF A POWERED KITE AND A SYSTEM AND METHOD FOR USE OF SAME

CROSS-REFERENCE TO RELATED APPLICATIONS

The present application is a continuation-in-part of U.S. patent application Ser. No. 13/070,157, filed Mar. 23, 2011, which claims priority to U.S. Provisional Application No. 61/341,029, filed Mar. 24, 2010. The entire contents of U.S. patent application Ser. No. 13/070,157 and U.S. Provisional Application No. 61/341,029 are herein incorporated by reference into the present application.

BACKGROUND

Embodiments disclosed herein relate to airborne flight and power generation systems, and more specifically to an airborne vehicle configured to maintain pitch control during tethered take-off and landing.

SUMMARY

The present disclosure discloses embodiments that relate to bridles for stability of a powered kite.

In one aspect, a system is disclosed. The system may include a ground station, a tether attached to the ground station on a first end and to two or more bridles on a second end, and a kite. The kite comprises a main wing. Each bridle of the two or more bridles is attached to the main wing, and the two or more bridles are adapted to provide a torque on the kite to control a roll of the kite.

In another aspect, a method is disclosed. The method may involve causing a kite to lift off the ground in a hover mode of flight. The kite comprises a main wing. The kite is oriented vertically in the hover mode of flight. The method may involve controlling a roll of the kite during the hover mode of flight at least in part with use of two or more bridles between the kite and a tether. Each bridle of the two or more bridles is attached to the main wing, and the two or more bridles are adapted to provide a torque on the kite to control the roll of the kite.

In another aspect, a method is disclosed. The method may involve causing a kite to lift off the ground in a hover mode of flight. The kite comprises a main wing. The kite is oriented vertically in the hover mode of flight. The method may involve transitioning the kite from the hover mode of flight to a crosswind mode of flight. The kite is oriented horizontally in the crosswind mode of flight. And the method may involve controlling a roll of the kite during the crosswind mode of flight at least in part with use of two or more bridles between the kite and a tether. Each bridle of the two or more bridles is attached to the main wing, and the two or more bridles are adapted to provide a torque on the kite to control the roll of the kite.

In another aspect, a system is disclosed. The system may include means for causing a kite to lift off the ground in a hover mode of flight, and means for controlling a roll of the kite during the hover mode of flight at least in part with use of two or more bridles between the kite and a tether. The kite comprises a main wing. The kite is oriented vertically in the hover mode of flight. Each bridle of the two or more bridles is attached to the main wing, and the two or more bridles are adapted to provide a torque on the kite to control the roll of the kite.

In yet another aspect, a system is disclosed. The system may include means for causing a kite to lift off the ground in a hover mode of flight, means for transitioning the kite from the hover mode of flight to a crosswind mode of flight, and controlling a roll of the kite during the crosswind mode of flight at least in part with use of two or more bridles between the kite and a tether. The kite comprises a main wing. The kite is oriented vertically in the hover mode of flight. The kite is oriented horizontally in the crosswind mode of flight. Each bridle of the two or more bridles is attached to the main wing, and the two or more bridles are adapted to provide a torque on the kite to control the roll of the kite.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

Various embodiments of the present disclosure are disclosed in the following detailed description and the accompanying drawings.

DETAILED DESCRIPTION

Figure 1:
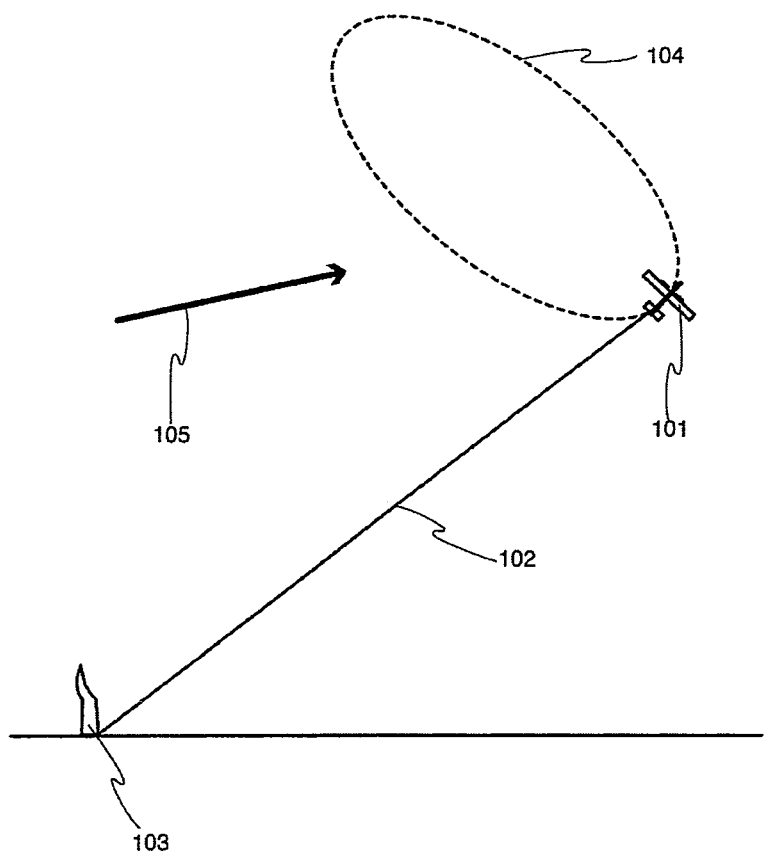
FIG. 1 is a diagram illustrating an embodiment of a tethered kite system according to some embodiments of the present disclosure.

Embodiments of the present disclosure can be implemented in numerous ways, including as a process; an apparatus; and a system. In this specification, these implementations, or any other form that the embodiments may take, may be referred to as techniques. In general, the order of the steps of disclosed processes may be altered within the scope of the disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the present disclosure is provided below along with accompanying figures that illustrate the principles of the embodiments. Numerous specific details are set forth in the following description in order to provide a thorough understanding of the embodiments of the present disclosure. These details are provided for the purpose of example. For the purpose of clarity, technical material that is known in the technical fields related to the embodiments has not been described in detail so that the disclosure is not unnecessarily obscured.

A configuration of aerodynamic surfaces and actuators useful in the launch, hover, transition, and landing of a powered kite is disclosed. In some embodiments, the powered kite comprises a main wing, a tail wing, and may comprise a number of other wings. The kite is connected to a tether which is connected to the ground or some other object. The kite comprises a number of rotors, which are used to generate thrust with the input of power or generate power at the cost of drag. The tail wing of the powered kite is located behind and above the center of mass and tether attachment location on the powered kite in the aerodynamic frame of the crosswind or static modes of flight. The tail wing is partially or fully actuated such that the tail wing maintains primarily attached aerodynamic flow and augments the stability of the kite when the kite is transitioning to and from the hovering mode of flight and while the wing is in the hovering mode of flight. The placement and actuation of the tail foil in the manner described improves the aerodynamic stability and increases the aerodynamic control authority in some modes of flight over a range of environmental conditions including conditions associated with a range of wind magnitudes, a range of wind directions, and a range of other qualities of wind.

A powered kite which is flown both in the manner of a tethered aircraft and in the manner of a tethered helicopter can be designed to incorporate aerodynamic surfaces that improve the pitch-axis aerodynamic stability of the craft in both modes of flight while having no significant detrimental effects on the stability in other axes. When flying in the manner of an aircraft on a string, the kite must primarily control or passively attenuate tension on the tether through the pitch axis of the kite in order to increase fatigue life or decrease tether and wing structural size and mass. When hovering in the manner of a helicopter, the kite must have adequate control authority on the pitch axis to prevent uncontrollable excitation of the tether by gusts of wind. Control of the pitch axis in both modes of flight may be improved by an all-moving tail high above and behind the main wing. When flying as a tethered airplane, the tail wing acts in the manner of a normal tail. Additionally, in some embodiments, the tail may add a stabilizing effect through tailoring of the tail wing airfoil drag coefficient such that it produces higher drag at negative angles of attack and lower drag at positive angles of attack, in a manner which increases the stability of the powered kite. When hovering, the apparent wind on the kite is roughly perpendicular to the main wing of the kite. When rotated 90 degrees to the main wing such that it faces into the wind while hovering, the tail wing provides a restoring moment. While it is possible to build a powered kite without this particular configuration of the aerodynamic surfaces, such a kite necessarily requires faster and more accurate control signals, and is thus less robust against sensor noise and component failure. While a tail on an aircraft can be placed in a similar location relative to the main wing for the purpose of keeping the horizontal tail out of the wake of the main wing, it does not serve the same purpose of canceling the aerodynamic moment about either or both the center of mass and tether attachment point when the main wing of the kite is either roughly parallel or roughly perpendicular to the perceived wind. It additionally does not serve the purpose of reducing excitation of the tether from wind while hovering.

In some embodiments of the present disclosure, as seen in FIG. 1 a powered kite 101 is adapted to fly while tethered. In some embodiments, the kite 101 comprises one or more airfoil elements with turbine driven generators mounted thereon. The kite 101 is attached by tether 102 to object 103, which may be a ground unit. In some embodiments, the ground unit may include winding and/or winching elements adapted to extend or to reel out the tether. In some embodiments, the tether 102 comprises both structural and electrical conductive aspects. The ground unit may be adapted to receive electrical energy routed from the kite 101 via tether 102. In some embodiments, kite 101 may operate in a crosswind mode of flight. Kite 101 may also fly in other modes of flight, including the stationary mode of flight and the hovering mode of flight. Kite 101 may be adapted to transition between the aforementioned modes of flight.

In some embodiments, kite 101 takes off from the ground in the hovering mode of flight and transitions into the crosswind mode of flight, for the purpose of electrical power generation. In some embodiments, the ground unit may include aspects adapted to support the kite while on the ground. In some embodiments, the kite is a positioned in a vertical configuration such that the "front" of the kite faces upward while constrained in the ground unit. In some embodiments, the system is adapted to begin a power generation mode with the kite constrained in the ground unit in such a manner. The turbine driven generators may be adapted to also function as motor driven propellers. The kite may use the motor driven propellers to provide thrust vertically downward in order to take off from the ground and raise to a desired altitude. As the kite increases its altitude, the ground unit may extend the tether. In some embodiments, the tether tension is monitored during the take off portion of a flight of the kite. At a desired altitude, the kite may begin a transition from the substantially vertical take-off mode to a regular flight mode, as described below. At the end of a flight, the kite 101 may transition out of a regular mode of flight into the hover mode of flight to land.

In some embodiments, after transitioning from hovering mode the kite 101 may fly in a regular, stationary flight mode at the end of the tether 102. In some embodiments, the kite 101 may fly in crosswind flight patterns. In some embodiments, the crosswind flight pattern may be substantially circular. In some embodiments, other flight patterns may be flown. In the crosswind mode of flight, kite 101 may fly on a flightpath 104 at an inertial velocity of equal or greater order of magnitude to the wind velocity 105. In various embodiments, flightpath 104 comprises a path through space, a path through a parameter space including prescribed targets through the path for power generation, tether tension, or other measurable variable, or any other appropriate path. In various embodiments, parameters comprise one or more of the following: tension on tether 102, load on kite 101, angular rotation rate of kite 101, or any other appropriate parameter.

In the stationary mode of flight, kite 101 may fly at a small inertial velocity compared to wind velocity 105. In this mode of flight, the majority of the lift holding kite 101 aloft comes from the flow of wind 105 over wings of kite 101.

When transitioning between modes of flight, kite 101 changes from one mode of flight to another mode of flight. In various embodiments, the transition modes of flight comprise highly dynamic maneuvers, slow maneuvers in nearly static balance, or any other appropriate maneuvers.

Figure 2:
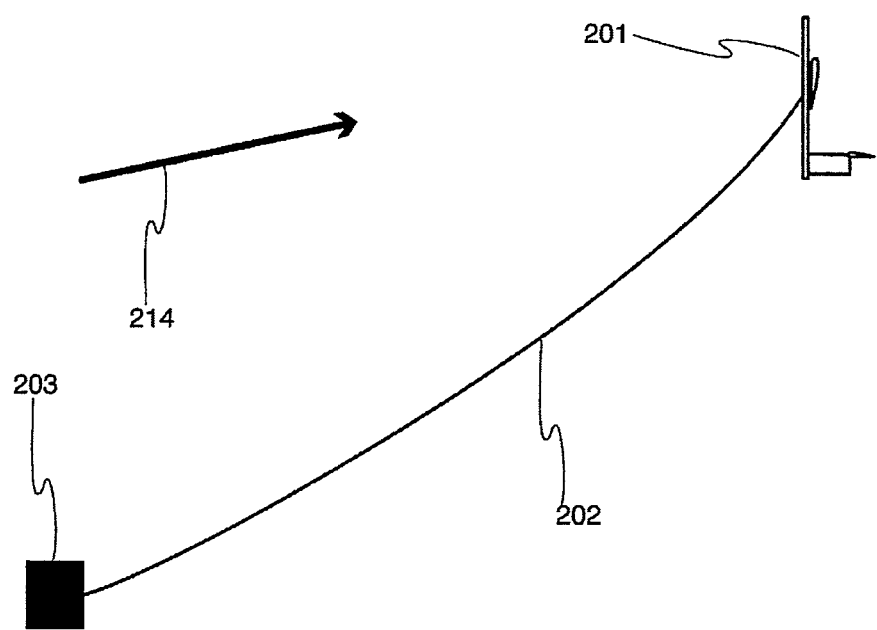
FIG. 2 is a diagram illustrating a powered kite system in hover mode according to some embodiments of the present disclosure.

FIG. 2 is a diagram illustrating an embodiment of a powered kite in the hovering mode of flight. In some embodiments of the present disclosure, the hovering mode of flight kite 201 uses rotors or some other means of on-board power to create thrust to oppose the force of gravity and to maintain position or move to a target position. In some embodiments, the turbine driven generators used to generate electrical energy while in crosswind flight mode may also function as motor driven propellers while in hover mode. Some force to oppose gravity may still be derived from wings of kite 201. In this mode of flight, the apparent wind 214 may be roughly perpendicular to the orientation of kite 201. Object 203 may be a ground station which supplies power to rotors on kite 201 to generate on-board thrust. In some embodiments, power to the rotors is provided by a power source on kite 201.

In various embodiments, object 203 comprises a base station attached to the ground, a ship, a cart, a payload not affixed to the ground, or any other appropriate object to which tether 202 is attached. In some embodiments, object 203 supplies power to kite 201 when thrust is being output by rotors on kite 201 and receives power from kite 201 when rotors are generating power at the expense of drag. In some embodiments, kite 201 uses on-board power such as batteries or a gas engine to provide power to rotors as needed.

Tether 202 comprises a high strength material to convey mechanical force from kite 201 to object 203. Tether 202 includes an electrical element to convey electrical power to kite 201 from object 203 or from object 203 to kite 201. In some embodiments, the electrical and mechanical elements of tether 202 are the same element. In some embodiments, tether 202 comprises elements to convey other forms of energy. In various embodiments, tether 202 comprises a fixed length tether, a variable length tether, or has any other appropriate characteristic or property for a tether. In some embodiments, tether 202 is able to be reeled in on a spool associated with object 203 or on a spool associated with kite 201.

Figure 3A:
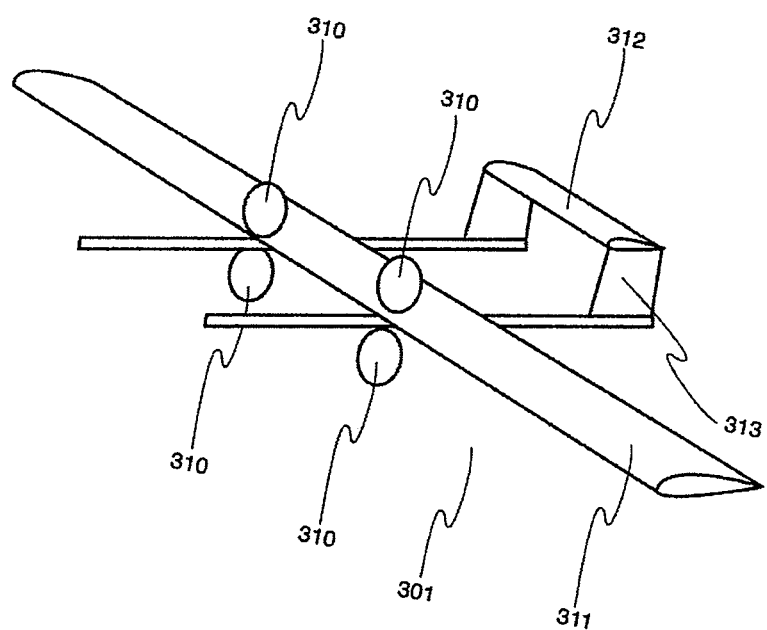
FIG. 3A is a sketch of a powered kite according to some embodiments of the present disclosure.
Figures 5A, 5B:
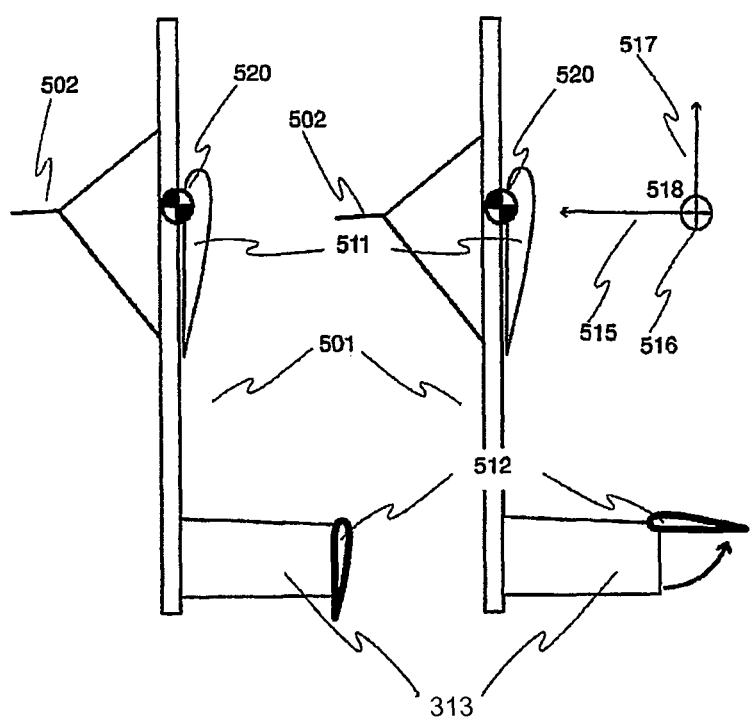
FIG. 5A is a diagram of a powered kite showing a first orientation of the tail wing according to some embodiments of the present disclosure.
FIG. 5B is a diagram of a powered kite showing a second orientation of the tail wing according to some embodiments of the present disclosure.

In some embodiments of the present disclosure, as seen in FIG. 3A a kite is adapted to fly in the various flight modes discussed above. In some embodiments, the kite 301 of FIG. 3A is used to implement kite 101 in the system of FIG. 1 or to implement kite 201 in the system of FIG. 2. In the example shown, kite 301 comprises a plurality of turbine/propellers, hereafter rotors 310. The rotors 310 comprise aerodynamic surfaces connected to a means of actuation which are used to generate power in the manner of a wind turbine, at the expense of increased drag, or are used to create thrust by the input of electrical or mechanical power. In some embodiments, the rotors 310 comprise an electric motor/generator connected to a fixed or variable pitch propeller. In various embodiments, a motor associated with a rotor of rotors 310 comprises a gas motor, the aerodynamic surface comprises a flapping wing, or the rotor comprises any other actuated aerodynamic surface capable of converting airflow into mechanical power or mechanical power into airflow. In some embodiments, rotors 310 are used to extract power or apply thrust while kite 301 is flying in the crosswind mode of flight along a flightpath, or in the static mode of flight, or is used to apply thrust when kite 301 is hovering (e.g., as depicted in FIG. 5B).

In some embodiments, rotors 310 are only capable of producing thrust. In various embodiments, rotors 310 comprise four individual rotors, a single individual rotor, or any other appropriate number of individual rotors or other aerodynamic actuators.

In the example shown, the kite 301 comprises a plurality of wings, for example, two wings 311 and 312. The main wing 311 comprises the main wing surface of the kite 301, and provides the majority of aerodynamic force in some modes of flight. In some embodiments, the main wing 311 comprises multiple wing sections. The tail wing 312 comprises the rearward wing surface of kite 301, and provides a smaller aerodynamic force primarily used to achieve stability and maintain a balance of forces and moments for the kite 301. In some embodiments, the tail wing 312 comprises many wing sections. In various embodiments, the kite 301 comprises other wings, such as wing 313, which are used for the generation of further lift, for further augmentation of the stability of the kite 301, to reduce the drag of some structural element of kite the 301, or for some other appropriate purpose. In some aspects, the wings 311, 312 and 313, and any other wings which the kite 301 comprises, and rotors 310 are connected by structural supports (e.g., spars).

In various embodiments, main wing 311, tail wing 312, the wing 313, and other wing surfaces on the kite 301 comprise rigid single element airfoils, flexible single element airfoils, airfoils with control surfaces, multiple element airfoils, or any other combination of airfoil types. In some embodiments, control surfaces on some wings on the kite 301 are deflected in the hover mode of flight in order to modify the aerodynamic properties or change the stability properties of the kite 301. In various embodiments, deflection of the trailing or leading element of a multi-element airfoil on a wing is used to induce stall for the desired portion of the transitions between flight modes, to change the center of aerodynamic pressure on that wing in the hovering mode of flight, or to stabilize the aerodynamic flow around the wing in a manner which reduces load variability on the wing in the hovering mode of flight.

Figure 3B:
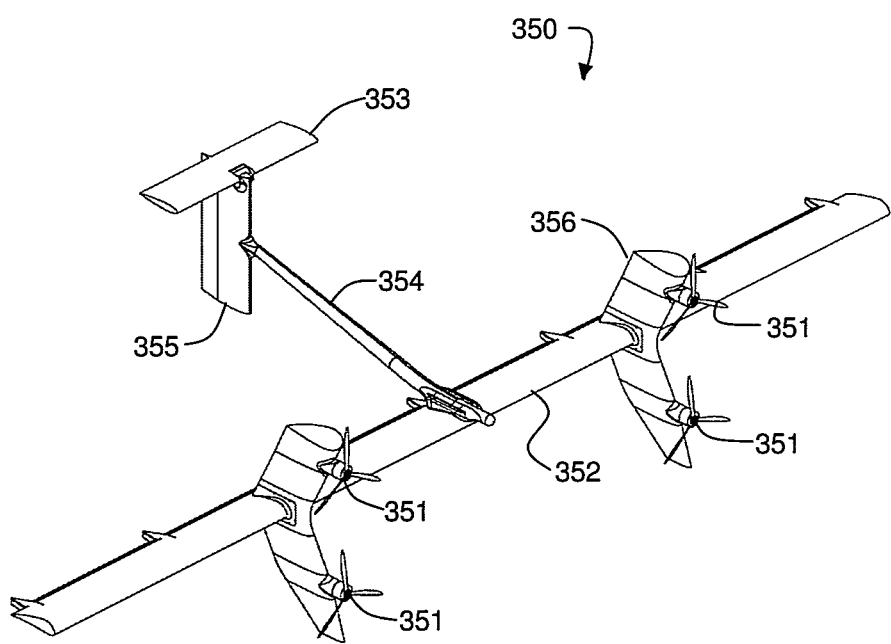
FIG. 3B is a sketch of a powered kite according to some embodiments of the present disclosure.

FIG. 3B is an illustrative example of a kite 350 according to some embodiments of the present disclosure. In this illustrative example, a main wing 352 provides the primary lift for the kite 350. The main wing 352 may have a wingspan of 8 meters. The area of the main wing 352 may be 4 square meters, and the main wing 352 may have an aspect ratio of 15. Four rotors 351 that may each include a turbine driven generator are mounted to the main wing 352 using pylons 356. The vertical spacing between the rotors may be 0.9 meters, equally spaced above and below the main wing 352. The turbine driven generators are adapted to also function as motor driven propellers in a powered flight mode, or in hover mode. The propeller radius may be 36 centimeters. A tail boom 354 is used to attach the rearward control surfaces to the main wing 352, and by extension, to the tether. The length of the tail boom may be 2 meters. A vertical stabilizer 355 is attached to the rear of the tail boom 354. Atop the vertical stabilizer 355 is the tail wing 353. The tail wing 353 may be 1 meter above the center of mass of the kite 350. The tail wing surface area may be 0.45 square meters. The kite 350 may be flown on a 140 meter tether in some embodiments.

Other configurations of the kite 350 are possible as well. For instance, in some embodiments, the tail wing 353 may be about 3.7 meters (or about 2-5 meters) above the center of mass of the kite 350. Moreover, in some embodiments, the length of the tail boom may be 7 meters (or about 6-8 meters). Further, in some embodiments, the main wing 352 may have wingspan of 26 meters (or about 20-30 meters). Further still, in some embodiments, the tail wing 353 may be located in front of vertical stabilizer 355. Moreover, in some embodiments, the kite 350 may weigh around 1 ton.

Moreover, in some embodiments, the tail wing 353 may not be located above the main wing 352. Instead, in some embodiments, the tail wing 353 may be located below the main wing 352 or at the same elevation as the main wing 352. Further, in some embodiments, a kite may not include a tail wing.

Although illustrated herein with a single element airfoil, in some embodiments the airfoil may comprise a plurality of elements. In some embodiments, there may be stacked airfoils, or other airfoil configurations.

Figure 4:
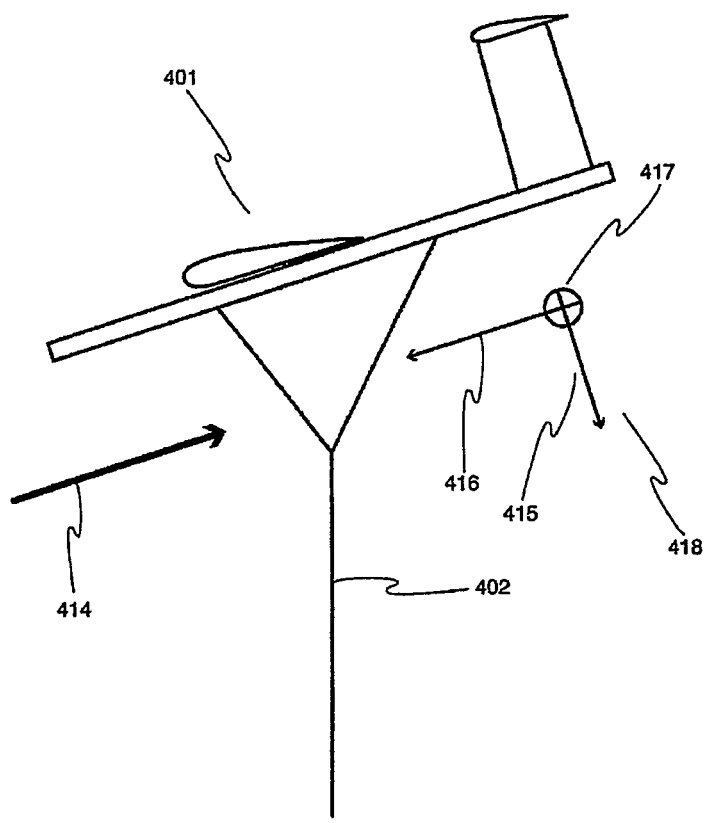
FIG. 4 is a diagram illustrating powered kite in crosswind flight, and associated coordinate system and apparent wind vector, according to some embodiments of the present disclosure.

FIG. 4 is a diagram illustrating an embodiment of a kite. In the example shown, kite 401 is flying in either the crosswind or static modes or flight. Kite 401 flies into an apparent wind 414 equal to the vector addition of the inertial velocity of the kite to the inertial velocity of the wind. The locations of various elements comprising kite 401 is denoted in coordinate frame 418. In coordinate frame 418, axis 416 on the kite, antiparallel to apparent wind 414, is denoted as 'x.' 'Z'-axis 415 points opposite the direction of lift when kite 401 is flying in the crosswind mode of flight. 'Y'-axis 417 is perpendicular to both 'x' axis 416 and 'z' axis 415 in a manner which gives a right-handed coordinate system when the coordinates are listed in the order ['x,' 'y,' 'z'].

In various embodiments, tether 402 is attached to kite 401 at one location, at two locations (e.g., to one side of the wing and to the another side of the wing or toward the front of the kite and toward the back of the kite), at a number of points on the kite (e.g., four) and where the tether is attached to a number of other bridles that attach to the number of points, or any other number of appropriate locations either directly or indirectly using bridles and/or any other appropriate connectors. In various embodiments, tether 402 is attached rigidly at a single point on kite 401 through all modes of flight, is attached in a manner that the center of rotation changes depending on the direction of force from the tether or due to some other variable, or any other appropriate manner of attachment. In various embodiments, the center of rotation of tether 402 on kite 401 is controlled by a linkage, a configuration of ropes or cables or some other appropriate mechanism. In some embodiments, tether 402 is affixed directly to kite 401. In some embodiments, tether 402 is attached to kite 401 in a manner such that the center of rotation tether 402 is different on different axes. In various embodiments, tether 402 is attached so that it can be released from kite 401, is permanently affixed, or is attached in any other appropriate manner.

In some embodiments, the raised aspect of the tail wing relative to the main wing, as viewed with the kite in a horizontal configuration, allows for an additional method of pitch control of the kite while the kite is in hover mode. With the kite facing vertically upward, the center of the lift of the tail wing resides rearward of the kite in a manner that allows changes in lift of the tail wing to use the lever arm of the rearward distance (the amount that the tail wing was above the main wing in the horizontal configuration) to put a moment around the center of gravity of the hovering kite. This force generated with the change in lift, levered around the distance behind the center of mass of the kite, puts a torque into the system such that changes in pitch of the kite can be controlled. As the kite may oscillate in pitch during maneuvers and hovering, a further rearward position ("raised position" in horizontal flight mode) of the tail wing during hover mode allows for some pitching of the kite while still maintaining the rearward aspect relative to vertical from ground. In some embodiments, the kite may be expected to pitch backward 10 degrees due to dynamic changes in wind, wind gusting, and for other reasons. In more extreme cases, 20 degrees of pitch variation may be seen. With a 10 degree design margin designed in beyond that, a design may be desired such that the center of lift of the tail wing is at a higher point than a 30 degree line rising rearward through the center of gravity of the kite, as viewed in a horizontal configuration. In some embodiments, the tail wing may be adapted to rotate above a point on a line that is angled 20 to 30 degrees off a horizontal axis through the center of mass, as viewed in a horizontal configuration. Although the kite will rotate about a center of rotation which includes the tether in its determination in most aspects of tethered flight, in hover mode the tether tension may vary, and thus the center of rotation in pitch may also vary between the center of mass of the kite and a location towards the tether.

FIGS. 5A and 5B are diagrams illustrating embodiments of a kite. In the examples shown, the tail wing 512 is shown in two orientations relative to the kite 501. Coordinate system 518 is assumed to be affixed to the kite 501. The tail wing 512 is located at a significant negative location on x axis 516 relative to both the attachment point of the tether 502 to the kite 501, or to the center of mass 520 of the kite 501. The main wing 511 is located at a significant negative location on z axis 515 relative to both the attachment point of the tether 502 to the kite 501, and to the center of mass 520 of the kite 501. Axis 517 is perpendicular to both x axis 516 and z axis 515. The tail wing 512 is further capable of being partially or fully rotated by means of mechanical or aerodynamic actuation. FIG. 5A illustrates the tail wing 512 positioned roughly parallel to the main wing 511 such that the tail wing 512 will maintain primarily attached aerodynamic flow in some or all of the range of conditions for which main wing 511 maintains primarily attached aerodynamic flow. In this orientation the tail wing 512 augments the stability of kite 501 by providing an aerodynamic restoring force in addition to an aerodynamic damping force. The orientation as seen in FIG. 5A may be used in stationary or cross wind flight in some aspects.

FIG. 5B illustrates the tail wing 512 positioned roughly perpendicular to the main wing 511 such that for apparent wind antiparallel to z axis 515, the tail wing 512 will maintain attached aerodynamic flow and provide both an aerodynamic restoring force and an aerodynamic damping force. The configuration as seen in FIG. 5B may be illustrative of the hover mode. The tail wing 512 may be actuated to provide desired control forces or may be held fixed in each mode of flight. In various embodiments, the tail wing 512 is rotated by means of a mechanical actuator or by means of the movement of an aerodynamic control surface. In some embodiments, the tail wing 512 rotates about a fixed point located within the airfoil. In various embodiments, the tail wing 512 rotates about some other point or a virtual center or the structure supporting the tail wing 512, rotates with wing 512, or any other appropriate manner of rotation. In some embodiments, multiple wings rotate to serve the function of the tail wing 512. In some embodiments, other wings or control surfaces rotate or deflect to modify the aerodynamic characteristics of the kite 501.

In some embodiments, the system is designed such that it maintains static aerodynamic balance at all moments of transition between the crosswind or static modes of flight and the hover mode of flight. For example, a kite which is able to transition between flight modes at an arbitrarily slow rate in high winds. The kite includes surfaces that engage wind with enough control authority (e.g., a sufficient area on a tail control surface that has a moment arm to change the attitude of the kite) to compensate for the time varying forces of buffeting the main wing (e.g., wind gusts on the wing)

In some embodiments, the system is designed such that the kite must undergo dynamic maneuvers to transition between flight modes. For example, the kite executes a maneuver, where the maneuver once started needs to finish. In other words, there is no way to control the kite in the middle of the maneuvers to stop the maneuver (or restart after stopping). So, a kite enters the hover mode by pitching up so that it heads straight up slowing down, and when close to stopping in a vertical position, the kite enters its hovering mode.

Figure 5C:
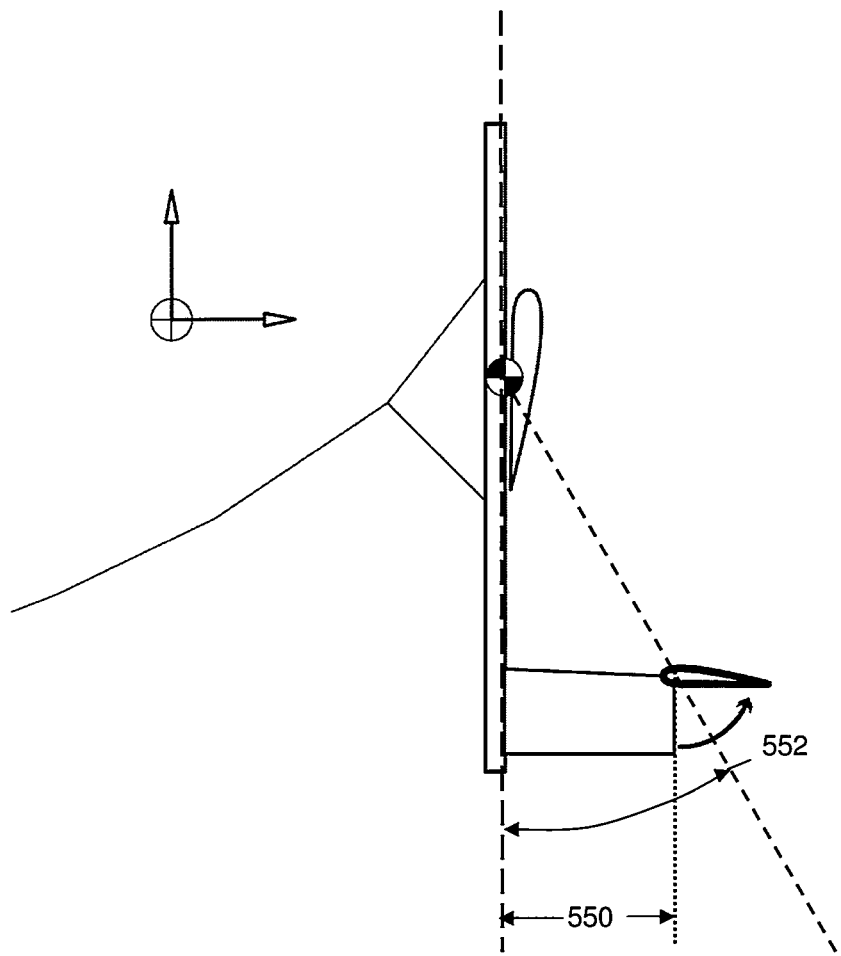
FIG. 5C is a diagram of kite and tail wing geometry according to some embodiments of the present disclosure.

FIG. 5C illustrates some of the geometric parameters seen with kite 501 when the tail wing 512 is actuated to a position as may be used in hover mode. In this illustrative example, the kite may be facing directly upward, and the wind may be hitting the kite directly perpendicular to the bottom of the main wing. In this situation, the lift of the tail wing may be altered to impart a moment around the center of mass, or the center of rotation, of the kite. The altering of the lift of the tail wing will result in a change in pitch of the kite, as the change in lift is levered around the distance 550 that the center of lift of the tail wing is rearward (in this configuration) of the center of mass of the kite. The angle 552 of a line drawn through the center of mass of the kite to the center of lift of the tail wing represents the functional range that changes in lift may be used to correlate changes in lift of the tail wing to a force in the same corresponding direction around the center of mass of the kite. Once the kite has pitched backward to the degree 552 of this line, an increase in lift of the tail wing will result in a pitch up, whereas until that degree an increase in lift of the tail wing will result in a pitch down. The distance 550 that the center of lift of the tail wing resides rearward of the center of the mass of the kite in this configuration dictates how many degrees off of vertical the kite may be controlled (using the same force sense) in the hover mode.

Figure 5D:
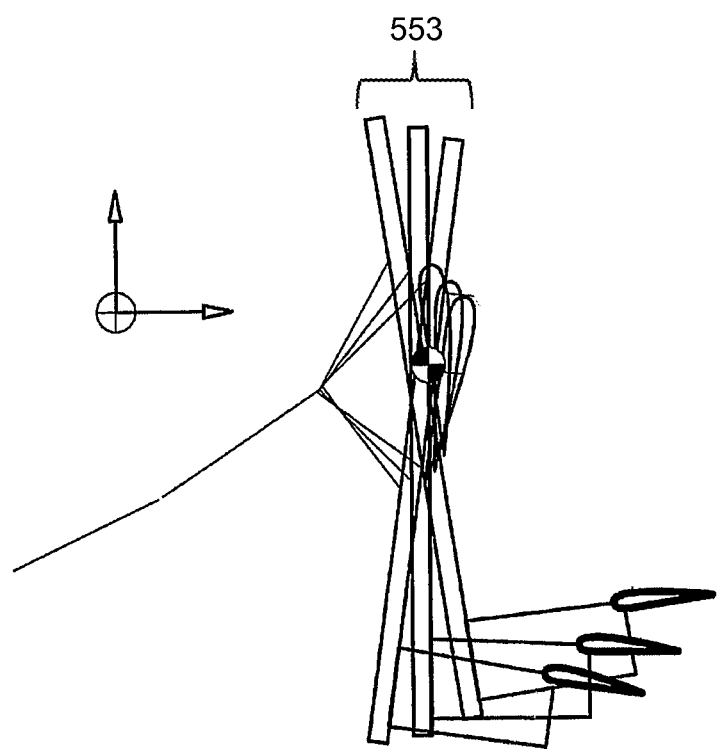
FIG. 5D is a diagram of various kite and tail wing positions according to some embodiments of the present disclosure.

FIG. 5D illustrates a variety of pitch conditions 553 of the kite during hover mode. As seen, the rearward aspect of the tail wing in this configuration (representing a raised aspect during horizontal flight) allows for pitch control utilizing changes in tail wing lift during a variety of possible positions. The rearward aspect of the tail wing allows for sufficient control during a variety of possible conditions, such as wind gusts or other deviations from vertical flight during hover mode.

Figure 5E:
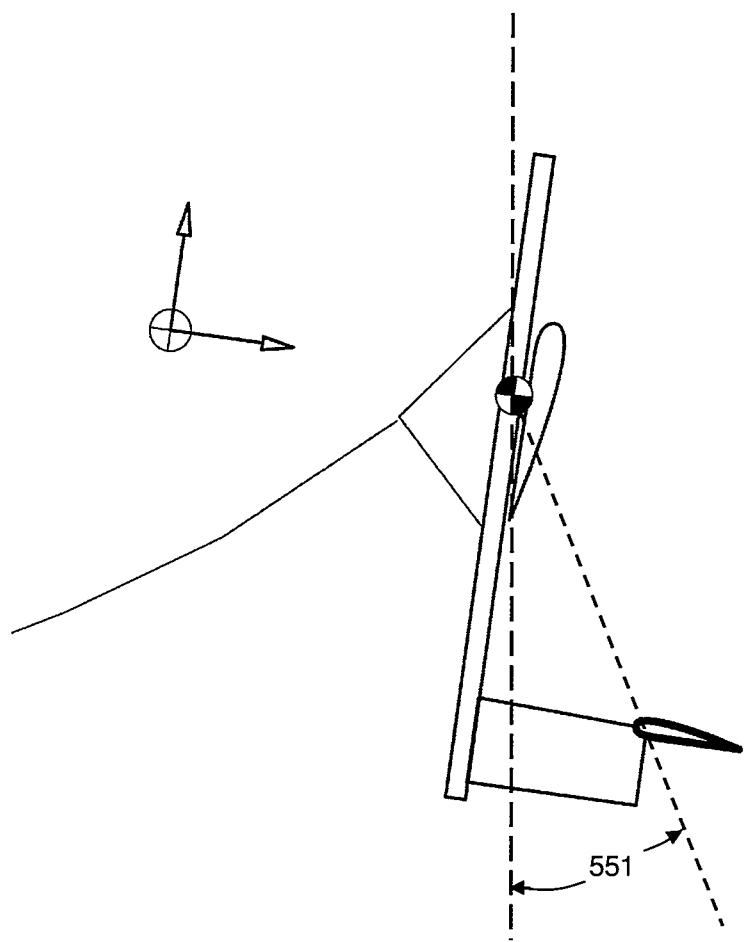
FIG. 5E is a diagram of a kite in hover mode with a pitch orientation according to some embodiments of the present disclosure.

FIG. 5E illustrates the kite 501 in a partially pitched rearward aspect during a hover mode operation. Despite the rearward pitch off of vertical, there is still sufficient angle 551 to allow for good control and pitch stability against wind gusts of the system. In some embodiments, the motor driven propellers of the kite will combine with the wind to deliver an apparent wind to the tail wing such that even more control may be available.

Figure 6A:
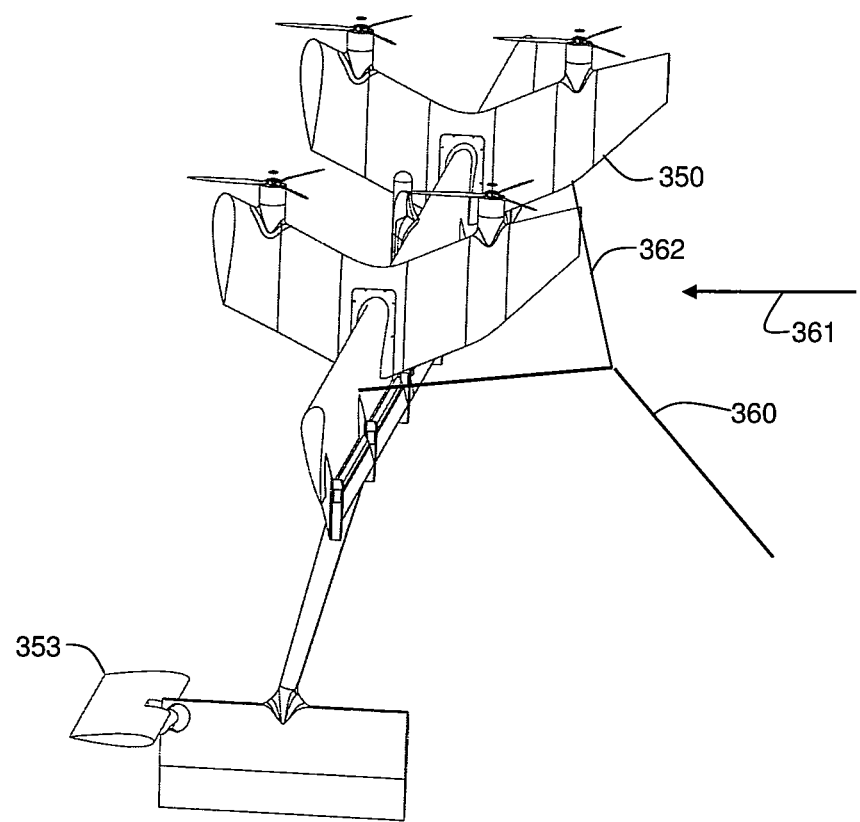
FIG. 6A is a drawing of a kite according to some embodiments of the present disclosure.

In some embodiments of the present disclosure, as seen in FIG. 6A, the kite 350 is seen in hover mode attached to the bridles 362, which attach to the tether 360. The tail wing 353 is in a horizontal position roughly perpendicular to the main wing in this configuration. The wind direction 361 is seen substantially perpendicular to the main wing. Bridles 362 create a torque on the kite 350 when the tether 360 exerts a force which is not symmetric in kite roll. In such embodiments, the bridles 362 restore the roll angle of the kite after disturbances, provided that some tether tension is present. By this means, the kite 350 may be hovered without sufficient control input to actively maintain a desired roll, or without any active roll control mechanism or control algorithm. In some embodiments of the present disclosure, bridles such as bridles 362 are not present, and tether 360 attaches directly to kite 350. In some such embodiments, the attachment point is placed to emulate the effect of bridles 362. In other embodiments, kite 350 may maintain some other means of roll control in hover.

In some embodiments of the present disclosure, the apparent wind of over the tail wing is a resultant of the actual wind and the propwash over the tail wing during flight in the hover mode. The tail wing may be used a lifting wing in the apparent wind and effect pitch control as described above.

Figure 6B:
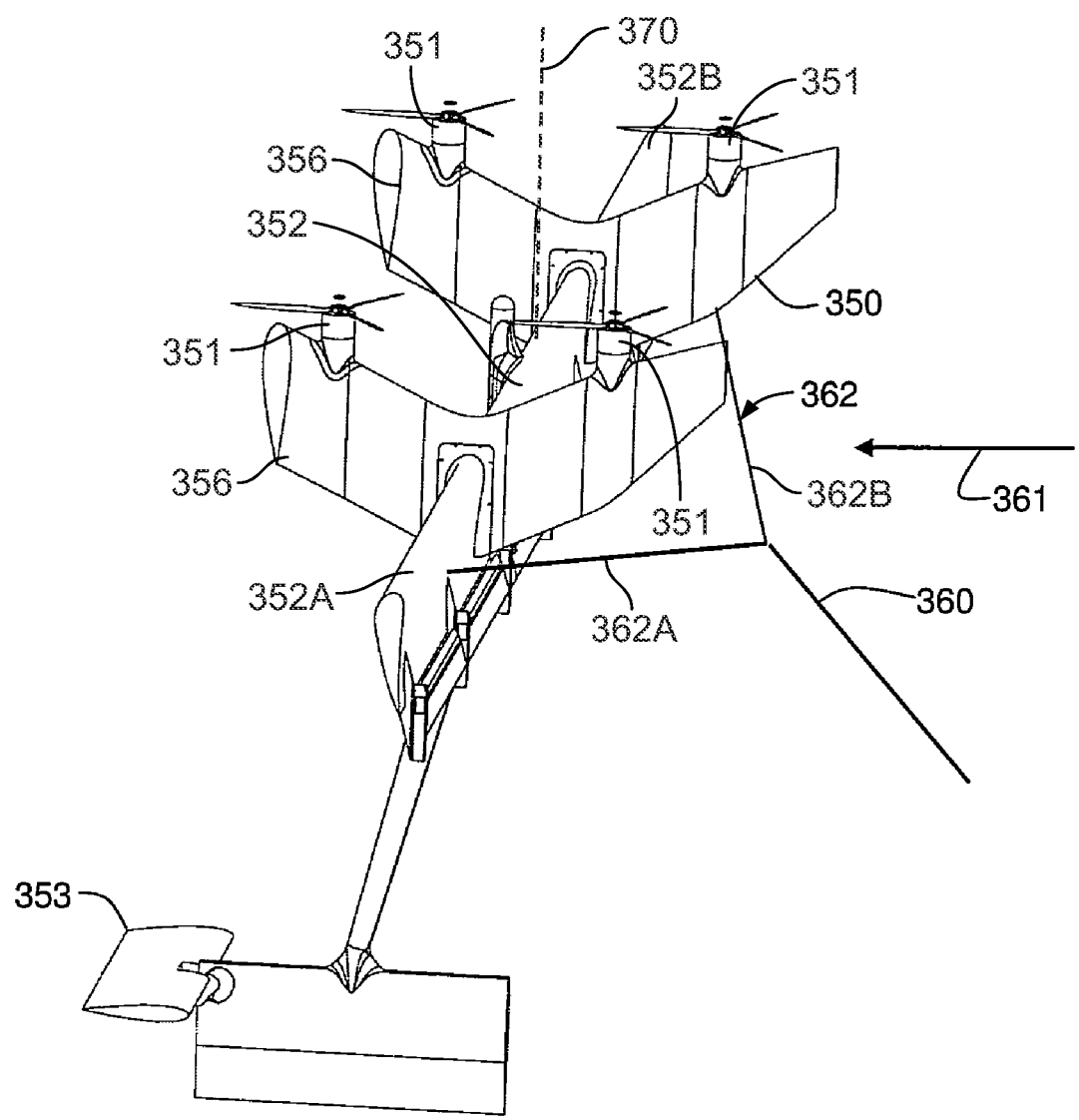
FIG. 6B is another drawing of a kite according to some embodiments of the present disclosure.

FIG. 6B shows another view of the kite 350 in hover mode attached to the bridles 362. In some embodiments, the bridles 362 may include two or more bridles that are adapted to provide a torque (or a moment) on the kite 350 to control a roll of the kite 350. For instance, in the illustrated example, the bridles 362 include two bridles, a first bridle 362A and a second bridle 362B. However, in other examples, the bridles 362 may include more than two bridles, such as three bridles, four bridles, etc. In addition, in some embodiments, the bridles 362 may each have a length of 4 to 5 meters. Other lengths of the bridles 362 are possible as well. In some embodiments, the torque may be a cross product of a force vector and a distance vector.

As shown in FIG. 6B, the first bridle 362A is attached to a first side 352A of a main wing 352 and the second bridle is attached to a second side 352B of the main wing 352. The first side 352A of the main wing 352 is opposite of the second side 352B of the main wing 352. In some embodiments, the first bridle 362A may be oriented substantially parallel to the second bridle 362B. For instance, the first bridle 362A may be oriented parallel to the second bridle 362B or a deviation from parallel that does not cause the kite 350 to operate in a significantly different manner from when the first bridle 362A is oriented parallel to the second bridle 362B. Moreover, in some embodiments, the first bridle 362A may be oriented at an angle to the second bridle 362B. In such embodiments, the angle may be from an axis defined by the main wing 352.

Further, in some embodiments, in response to a force on the kite 350 provided by the tether 360, the first bridle 362A and the second bridle 362B may be adapted to provide the torque on the kite 350 to control the roll of the kite 350, such that the torque causes a change in the roll of the kite. And in at least one such embodiment, the force on the kite 350 may be asymmetric along a roll axis 370. In some examples, the roll axis 370 may take the form of or be similar in form to the axis 517.

In some examples, other components of the kite 350 may be adapted to provide a second torque (or a second moment) on the kite 350 that opposes the torque provided by the first bridle 362A and the second bridle 362B. For instance, in some embodiments, the rotors 351 mounted to the main wing 352 using the pylons 356 may be adapted to provide a second torque on the kite 350 and in response to a force on the kite provided by the tether 360 and the second torque on the kite 350, the first bridle 362A and the second bridle 362B may be adapted to provide the torque on the kite 350, such that the torque on the kite causes a change in the roll of the kite 350. And in at least one such embodiment, the second torque on the kite 350 provided by the rotors 351 may be substantially opposite the torque on the kite 350 along the roll axis 370 provided by the first bridle 362A and the second bridle 362B. For instance, the second torque may be opposite the torque or a deviation from opposite that does not cause the kite 350 to operate in a significantly different manner from when the second torque is opposite the torque. In some embodiments, the second torque may be a cross product of a force vector and a distance vector. The rotors 351 may take the form of or be similar in form to the rotors 310.

In the illustrated example, the rotors 351 include four rotors. In some embodiments, when the rotors 351 are adapted to provide the second torque on the kite 350, each of the rotors 351 may rotate in substantially the same direction. For instance, when the rotors 351 are providing thrust each of the rotors 351 may rotate in the same direction or a deviation from the same that does not cause the kite 350 to operate in a significantly different manner. Moreover, in some embodiments, when the rotors 351 are adapted to provide the second torque on the kite 350, some or all of the rotors 351 may rotate in different directions. Further, in some embodiments, when the rotors 351 are providing thrust each of the rotors 351 may rotate with substantially the same speed. For instance, each of the rotors may rotate with the same speed or a deviation from the same that does not cause the kite 350 to operate in a significantly different manner. Moreover, in some embodiments, when the rotors 351 are adapted to provide the second torque on the kite 350, some or all of the rotors may rotate with different speeds.

In some examples, other components of the kite 350 may be adapted to provide a second torque on the kite 350, such that the torque on the kite 350 provided by the first bridle 362A and the second bridle 362B and the second torque on the kite 350 cause a change in the roll of the kite 350. With this arrangement, the second torque may augment the torque. For instance, in some embodiments, the rotors 351 may be adapted to provide a second torque on the kite 350 and in response to a force on the kite 350 provided by the tether 360, the first bridle 362A and the second bridle 362B may be adapted to provide the torque on the kite 350, such that the torque on the kite 350 and the second torque on the kite 350 cause a change in the roll of the kite 350. And in at least one such embodiment, the second torque on the kite 350 provided by the rotors 351 may be substantially parallel to the torque on the kite 350 along the roll axis 370 provided by the first bridle 362A and the second bridle 362B. For instance, the second torque may be parallel to the torque or a deviation from parallel that does not cause the kite 350 to operate in a significantly different manner from when the second torque is parallel to the torque.

Further, in at least one such embodiment, the torque on the kite 350 provided by the first bridle 362A and the second bridle 362B may have a magnitude that is greater than a magnitude of the second torque on the kite 350 provided by the rotors 351. However, in other embodiments, the torque on the kite 350 may have a magnitude that is less than a magnitude of the second torque on the kite 350. For instance, in some embodiments, when the magnitudes of the torque and the second torque are combined, the torque may be 90 to 95 percent of the combination of the torque and the second torque.

The magnitude of the torque on the kite 350 provided by the first bridle 362A and the second bridle 362B may depend on wind speed and tension in the tether 360. In some embodiments, as the wind speed and the tension in the tether 360 increase, the magnitude of the torque provided by the first bridle 362A and the second bridle 362B may increase. In some examples, when the wind speed is low and the tension in the tether 360 is low, the magnitude of the torque provided by the first bridle 362A and the second bridle 362B may be less than the magnitude of the second torque provided by the rotors 351. Moreover, in some examples, when the wind speed is high and the tension in the tether 360 is high, the magnitude of the torque provided by the first bridle 362A and the second bridle 362B may be greater than the second torque provided by the rotors 351.

In some examples, the magnitude of the torque on the kite 350 provided by the first bridle 362A and the second bridle 362B may be between 10 Kilonewton-meter per radian (kN-m/rad) and 130000 kN-m/rad and each rotor of the rotors 351 may provide a torque with a magnitude of 400 Newton-meters (Nm). With this arrangement, the magnitude of the second torque on the kite 350 provided by the rotors 351 may be N multiplied by 400 Nm, where N is the number of rotors.

In some examples, when the magnitude of the torque on the kite 350 provided by the first bridle 362A and the second bridle 362B is less than the magnitude of the second torque provided by the rotors 351 (e.g., when the magnitude of the torque is 10 kN-m/rad), the second torque on the kite 350 provided by the rotors 351 may contribute more to causing a change in the roll of the kite 350 than the torque on the kite 350 provided by the first bridle 362A and the second bridle 362B. And in such examples, the second torque on the kite 350 provided by the rotors 351 may assist with stabilizing the kite 350.

Moreover, in some examples, when the magnitude of the torque on the kite 350 provided by the first bridle 362A and the second bridle 362B is greater than the magnitude of the second torque on the kite 350 provided by the rotors 351 (e.g., when the magnitude of the torque is 130000 kN-m/rad), the second torque on the kite 350 provided by the rotors 351 may contribute less to causing a change in the roll of the kite 350 than the torque on the kite 350 provided by the first bridle 362A and the second bridle 362B.

Moreover, in some embodiments, the main wing 352 may include one or more control surfaces 315 that are adapted to provide a second torque on the kite 350 and in response to a force on the kite 350 provided by the tether 360, the first bridle 362A and the second bridle 362B may be adapted to provide the torque on the kite, such that the torque on the kite 350 and the second torque on the kite 350 cause a change in the roll of the kite. And in at least in one such embodiment, the second torque on the kite 350 provided by the one or more control surfaces 315 may be substantially parallel to the torque on the kite 350 along the roll axis 370 provided by the first bridle 362A and the second bridle 362B. For instance, the second torque may be parallel to the torque or a deviation from parallel that does not cause the kite 350 to operate in a significantly different manner from when the second torque is parallel to the torque.

Further, in at least one such embodiment, the torque on the kite 350 provided by the first bridle 362A and the second bridle 362B may have a magnitude that is greater than a magnitude of the second torque on the kite provided by the one or more control surfaces 315. However, in other embodiments, the torque on the kite 350 may have a magnitude that is less than a magnitude of the second torque on the kite 350.

The one or more control surfaces 315 may take various different forms in various different embodiments. For instance, the one or more control surfaces 315 may include winglets, flaps (e.g., Fowler flaps, Hoerner flaps, split flaps, and the like), rudders, elevators, spoiler, dive brakes, etc. Further, the one or more control surfaces 315 may be located on a leading edge of the main 352 and/or a trailing edge of the main wing 352.

Moreover, in some embodiments, the main wing 352 may be curved, such that the main wing 352 is adapted to provide a second torque on the kite 350 and in response to a force on the kite provided by the tether 360, the first bridle 362A and the second bridle 362B may be adapted to provide the torque on the kite 350, such that the torque on the kite 350 and the second torque on the kite 350 cause a change in the roll of the kite 350. And in at least in one such embodiment, the second torque on the kite 350 provided by the main wing 352 may be substantially parallel to the torque on the kite 350 along the roll axis 370 provided by the first bridle 362A and the second bridle 362B. For instance, the second torque may be parallel to the torque or a deviation from parallel that does not cause the kite 350 to operate in a significantly different manner from when the second torque is parallel to the torque. In other embodiments, the main wing 352 may be substantially flat. For instance, the main wing 352 may be flat or a deviation from flat that does not cause the kite 350 to operate in a significantly different manner from when the main wing 352 is flat.

The curvature of the main wing 352 may take various different forms in various different embodiments. For instance, the main wing 352 may have a dihedral, such that the main wing 352 is adapted to provide a second torque on the kite 350. As another example, the main wing 352 may have a polyhedral angle, such that the main wing 352 is adapted to provide a second torque on the kite 350. In some embodiments, the polyhedral angle may be between 5 to 10 degrees starting at a semispan of the main wing 352. Moreover, in some embodiments, the polyhedral angle may be 20 degrees for a span of the main wing 352, such as 0.1 of the span from an edge of the main wing 352. Further, in some embodiments, the main wing 352 may follow an arc or a parabolic polyhedral distribution.

Further, in at least one such embodiment, the torque on the kite 350 provided by the first bridle 362A and the second bridle 362B may have a magnitude that is greater than a magnitude of the second torque on the kite provided by the main wing 352. However, in other embodiments, the torque on the kite 350 may have a magnitude that is less than a magnitude of the second torque on the kite 350.

Although the bridles 362 have been described above as being adapted to provide a torque to control a roll of the kite 350 when the kite 350 is in the hover mode of flight, in other examples the bridles 362 may be adapted to provide a torque to control a roll of the kite 350 when the kite 350 is in the crosswind mode of flight.

Similarly, although other components of the kite 350 (e.g., the rotors 351) have been described above as being adapted to provide a second torque on the kite 350 that opposes the torque provided by the first bridle 362A and the second bridle 362B when the kite 350 is in the hover mode of flight, in other examples the other components may be adapted to provide a second torque on the kite that opposes the torque provided by the first bridle 362A and the second bridle 362B when the kite 350 is in the crosswind mode of flight. Further, although other components of the kite 350 (e.g., the rotors 351 and/or the main wing 352) have been described above as being adapted to provide a second torque on the kite 350, such that the torque on the kite 350 and the second torque on the kite 350 cause a change in the roll of the kite 350 when the kite 350 in the hover mode of flight, in other examples the other components of the kite 350 may be adapted to provide a second torque on the kite 350, such that the torque on the kite 350 and the second torque on the kite 350 cause a change in the roll of the kite 350 when the kite 350 is in the crosswind mode of flight. In some examples, the rotors 351 may be adapted to provide the second torque on the kite 350 when the rotors 351 generate electrical energy while in the crosswind flight mode.

Figure 7:
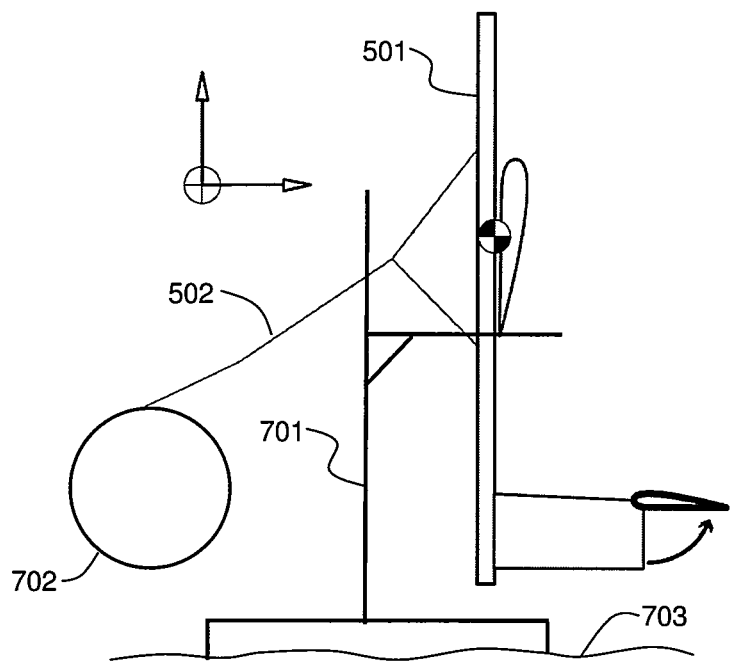
FIG. 7 is a sketch of a kite mounted on a take-off structure according to some embodiments of the present disclosure.

In some embodiments of the present disclosure, as seen in FIG. 7, the kite 501 is seen mounted to a support structure 701 adapted to receive the kite 501 during a landing, and to support the kite 501 prior to take off. In some embodiments, a winch 702 may be adapted to reel in the tether 502 during landing of the kite 501. The support structure 701 may reside on the ground 703 in some aspects, or in other locations.

Figure 8:
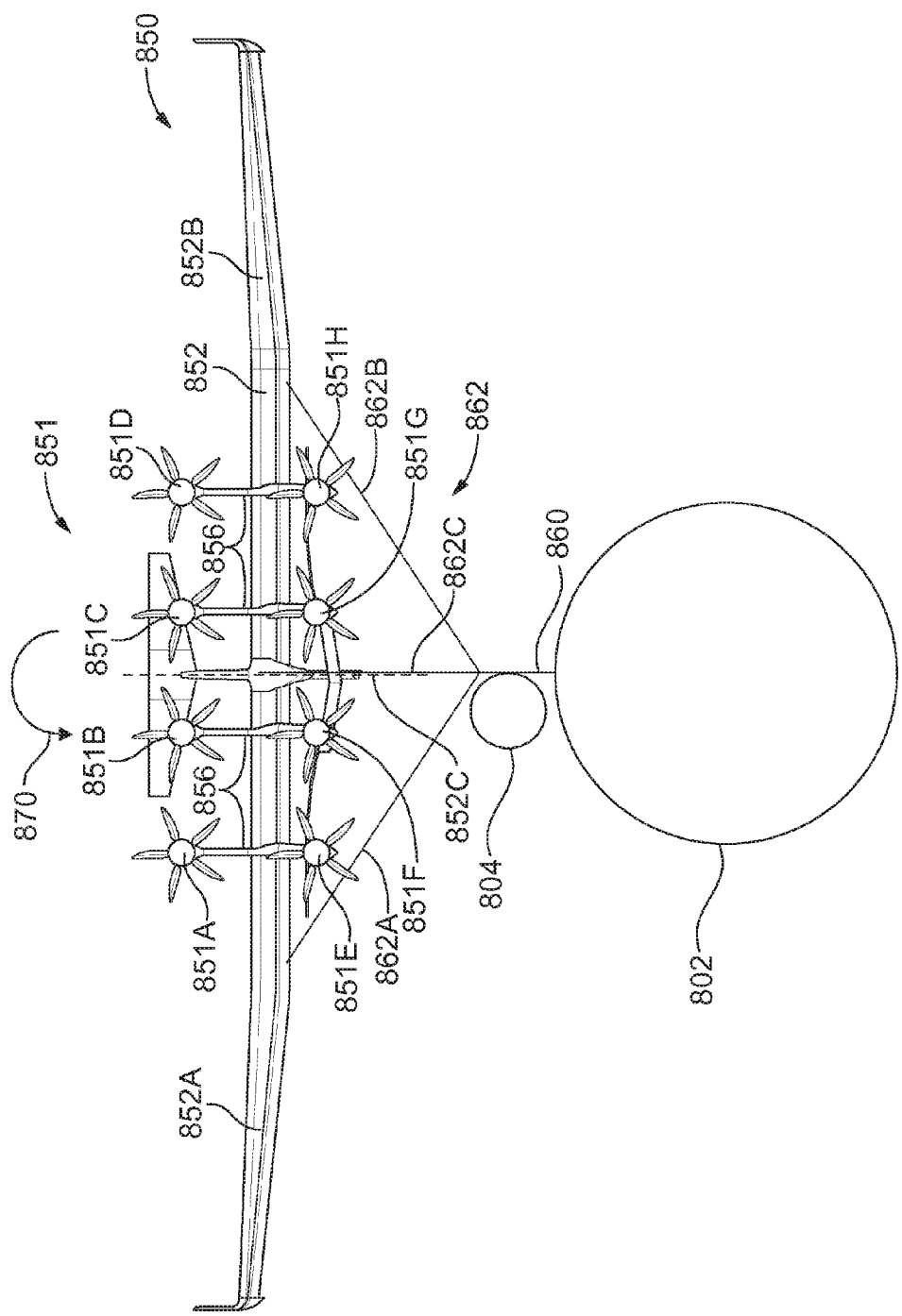
FIG. 8 is a drawing of a kite according to some embodiments of the present disclosure.

Further, in some examples, illustrative bridles may be adapted to provide a torque to control a roll of a kite when a kite is lifting off or landing in the hover mode of flight. FIG. 8 shows a view of a kite 850 attached to bridles 862. The bridles 862 attach to the tether 860. In the illustrated example, a winch 802 may be adapted to deploy the tether 860 during lift off and reel in the tether 860 during landing. In some embodiments, a ground-side gimble 804 may be adapted to unwind the tether 860 during lift off.

The kite 850 may be similar in form to the kite 350. For instance, as shown in FIG. 8, the kite 850 includes a main 852 and rotors 851 that may be mounted to the main wing 852 using pylons 856. In the illustrated example, the rotors 851 includes eight rotors: a first rotor 851A, a second rotor 851B, a third rotor 851C, a fourth rotor 851D, a fifth rotor 851E, a sixth rotor 851F, a seventh rotor 851G, and an eighth rotor 851H. Some of or all of the rotors 851 may take the form of or be similar in form to the rotors 351. In addition, the main wing 852 may take the form of or be similar in form to the main wing 352. For instance, in some embodiments, the main wing 852 may include one or more control surfaces. Moreover, in some embodiments, the main wing 852 may be curved or substantially flat. Further still, the pylons 856 may take the form of or be similar in form to the pylons 356.

The bridles 862 may be similar in form to the bridles 362. In the illustrated example, the bridles 862 includes three bridles: a first bridle 862A, a second bridle 862B, and a third bridle 862C. The first bridle 862A, the second bridle 862B, and/or the third bridle 862C may be attached to the main wing 852 in the same or similar way as the first bridle 362A and/or the second bridle 362B may be attached to the main wing 352. In addition, the first bridle 862A, the second bridle 862B, and/or the third bridle 862C may be oriented in the same or similar way as the first bridle 362A and/or the second bridle 362B may be oriented. For instance, as shown in FIG. 8, the main wing 852 may include a first side 852A, a second side 852B, and a center line 852C, and the first bridle 862A may be attached to the first side 852A of the main wing 852, the second bridle 862B may be attached to the second side 852B of the main wing 852, and the third bridle 862C may be attached to a portion on the main wing 852 that is located substantially on the center line 852C. For instance, the portion may be on the centerline 852C or a deviation from on the centerline 852C that does not cause the kite 850 to operate in a significantly different manner from when the portion is on the centerline 852C.

The first bridle 862A, the second bridle 862B, and the third bridle 862C may be adapted to provide a torque to control a roll of the kite 850 when the kite 850 is lifting off and/or landing in the same or similar way as the first bridle 362A and the second bridle 362B may be adapted to provide a torque to control a roll of the kite 350 as described with reference to FIGS. 6A and 6B. In some embodiments, control of the roll of the kite 850 may allow the kite 850 to contact a perch (not shown) associated with the winch 802.

Moreover, the rotors 851 may be adapted to provide a second torque on the kite 850 that opposes the torque provided by the first bridle 862A, the second bridle 862B, and the third bridle 862C when the kite 850 is lifting off and/or landing in the same or similar way as the rotors 351 may be adapted to provide a second torque on the kite 350 that opposes the torque provided by the first bridle 362A and the second bridle 362B. For instance, in some embodiments, each of the rotors 851 may rotate in substantially the same direction and/or substantially the same speed. In addition, in some embodiments, the first rotor 851A, the second rotor 851B, the third rotor 851C, and the fourth rotor 851D may rotate in a first direction; and the fifth rotor 851E, the sixth rotor 851F, the seventh rotor 851G, and the eighth rotor 851H may rotate in a second direction. And in at least one such embodiment, the first direction may be substantially opposite the second direction. For instance, the first direction may be opposite the second direction or a deviation from opposite that does not cause the kite 850 to operate in a significantly different manner when the first direction is opposite the second direction.

Further, the rotors 851 may be adapted to provide a second torque on the kite 850, such that the torque on the kite 850 and the second torque on the kite 850 cause a change in the roll of the kite when the kite 850 is lifting off and/or landing in the same or similar way as the rotors 351 may be adapted to provide a second torque on the kite 350, such that the torque on the kite 350 and the second torque on the kite 350 cause a change in the roll of the kite as described with reference to FIG. 6B. For instance, the second torque may be substantially opposite the torque along a roll axis 870. The roll axis 870 may take the form of or be similar in form to the roll axis 370. In FIG. 8, the roll axis 870 may be directed out of the page (as indicated by the counterclockwise arrow).

Further, the main wing 852 may be adapted to provide a second torque on the kite 850, such that the torque on the kite 850 and the second torque on the kite 850 cause a change in the roll of the kite when the kite 850 is lifting off and/or landing in the same or similar way as the main wing 352 may be adapted to provide a second torque on the kite 350, such that the torque on the kite 350 and the second torque on the kite 350 cause a change in the roll of the kite as described with reference to FIG. 6B. For instance, the second torque may be substantially parallel to the torque along the roll axis 870.

In some examples, when the kite 850 lands, the kite 850 may be positioned at a roll angle, a yaw angle, and pitch angle. In some embodiments, the roll angle may be 5 degrees, the yaw angle may be 7 degrees, and the pitch angle may 10 degrees.

Figure 9:
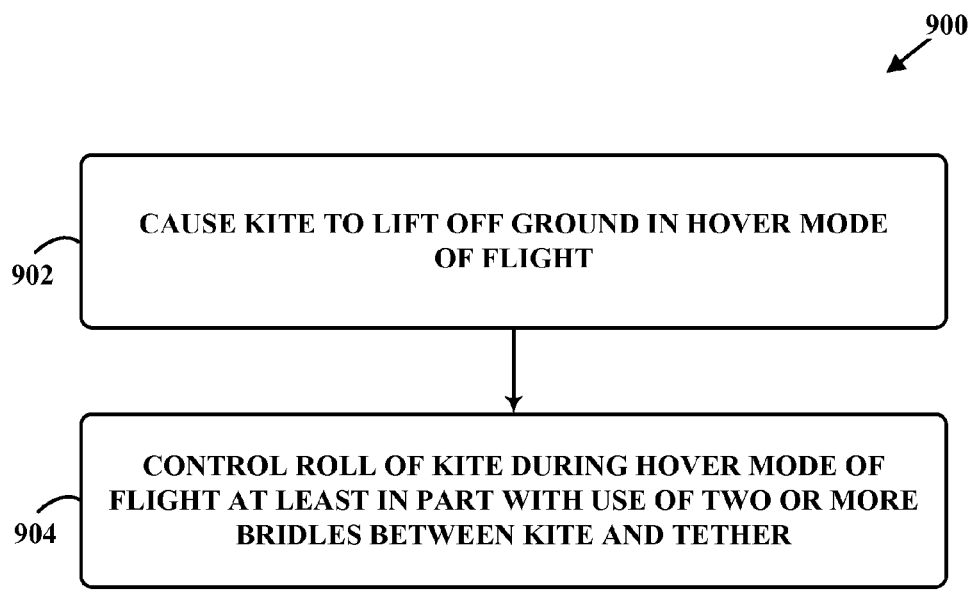
FIG. 9 is a flow chart of a method according to some embodiments of the present disclosure.

FIG. 9 is a flow chart illustrating a method 900, according to an example embodiment. The method 900 may include one or more operations, functions, or actions as illustrated by one or more blocks 902-904. Although the blocks are illustrated in a sequential order, these blocks may in some instances be performed in parallel. Also, the various blocks may be combined into fewer blocks, divided into additional blocks, and/or removed based upon the desired implementation.

Illustrative methods, such as method 900, may be carried out in whole or in part by a component or components of a kite. For simplicity, method 900 may be described generally as being carried out by a kite, such as the kite 350 and the kite 850. However, it should be understood that example methods, such as method 900, may be carried out by other entities or combinations of entities without departing from the scope of this disclosure.

At block 902, the method 900 involves causing a kite to lift off the ground in a hover mode of flight. The kite may include a main wing. And the kite may be oriented vertically in the hover mode of flight. The kite may take the form of or be similar in form to the kite 101, the kite 201, the kite 350, the kite 401, the kite 501 and/or the kite 850, and the main wing may take the form of or be similar in form to the main wing 311, the main wing 352, the main wing 511, and/or the main wing 852.

At block 904, the method 900 involves controlling a roll of the kite during the hover mode of flight at least in part with use of two or more bridles between the kite and a tether. Each bridle of the two or more bridles may be attached to the main wing, and the two or more bridles may be adapted to provide a torque on the kite to control the roll of the kite. The two or more bridles may take the form of or be similar in form to the first bridle 362A and the second bridle 362B and/or the first bridle 862A, the second bridle 862B, and the third bridle 862C.

In some embodiments, in response to a force on the kite provided by the tether, the two or more bridles may be adapted to provide the torque on the kite to control the roll of the kite, such that the torque on the kite causes a change in the roll of the kite. Moreover, in some embodiments, causing the kite to lift off the ground in the hover mode of flight may involve controlling the roll of the kite during lift off at least in part with the use of the two or more bridles. Further, in some embodiments, the kite may further include one or more rotors attached to the main wing, wherein the one or more rotors may be adapted to provide a second torque on the kite that is substantially opposite the torque on the kite along a roll axis of the kite, and wherein in response to (i) a force on the kite provided by the tether and (ii) the second torque on the kite, the two or more bridles may be adapted to provide the torque on the kite, such that the torque on the kite causes a change in the roll of the kite. Further still, in some embodiments, the kite may further include one or more rotors attached to the main wing, wherein the one or more rotors may be adapted to provide a second torque on the kite that is substantially parallel to the torque on the kite along a roll axis of the kite, and wherein in response to a force on the kite provided by the tether, the two or more bridles may be adapted to provide the torque on the kite, such that the torque on the kite and the second torque on the kite cause a change in the roll of the kite. The one or more rotors may take the form of or be similar in form to the rotors 310, the rotors 351, and/or the rotors 851.

Moreover, in some embodiments, the main wing may include one or more control surfaces, and wherein the one or more control surfaces are adapted to provide a second torque that is substantially parallel to the torque on the kite along a roll axis of the kite, and wherein in response to a force on the kite provided by the tether, the two or more bridles are adapted to provide the torque on the kite, such that the torque on the kite and the second torque on the kite cause a change in the roll of the kite. Further, in some embodiments, the main wing may be curved, such that the main wing is adapted to provide a second torque that is substantially parallel to the torque on the kite along a roll axis of the kite, and wherein in response to a force on the kite provided by the tether, the two or more bridles may be adapted to provide the torque on the kite, such that the torque on the kite and the second torque on the kite cause a change in the roll of the kite.

Further, the method 900 may further involve landing the kite in the hover mode of flight. The landing may involve controlling the roll of the kite at least in part with the use of the two or more bridles.

Figure 10:
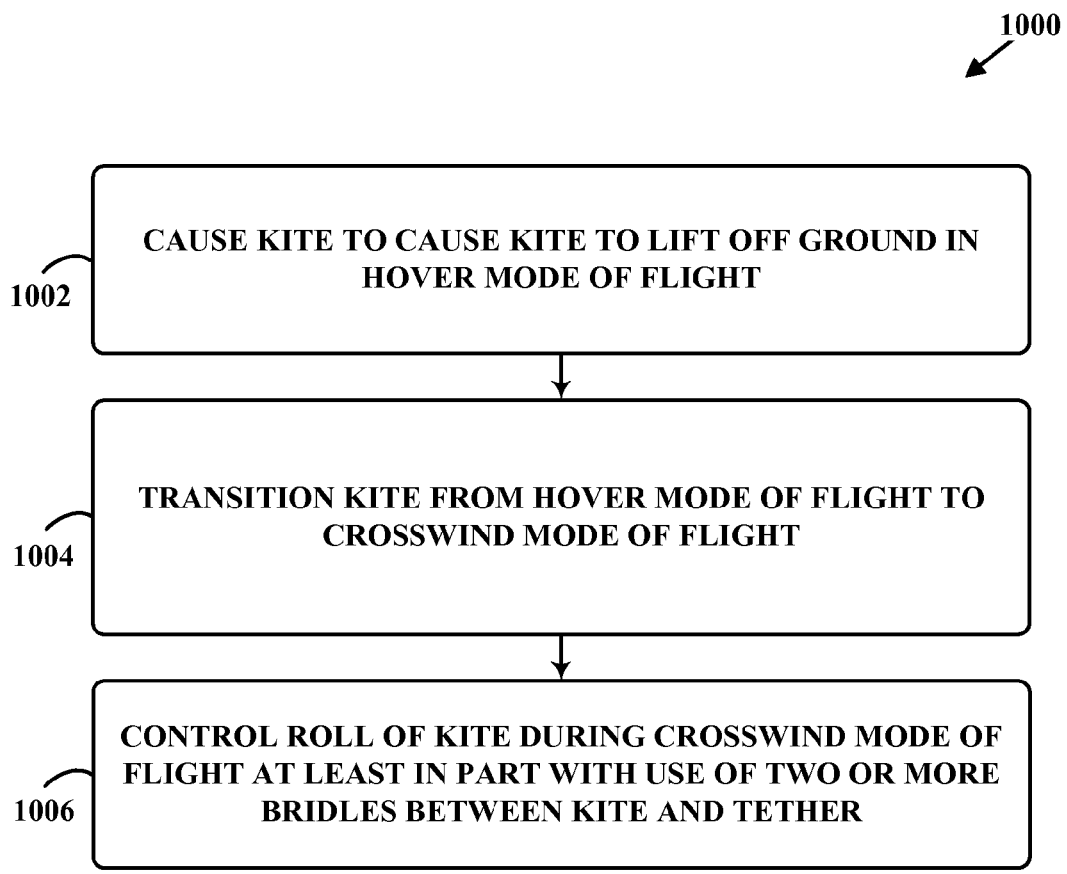
FIG. 10 is a flow chart of another method according to some embodiments of the present disclosure.

FIG. 10 is a flow chart illustrating a method 1000, according to an example embodiment. The method 1000 may include one or more operations, functions, or actions as illustrated by one or more blocks 1002-1006. Although the blocks are illustrated in a sequential order, these blocks may in some instances be performed in parallel. Also, the various blocks may be combined into fewer blocks, divided into additional blocks, and/or removed based upon the desired implementation.

Illustrative methods, such as method 1000, may be carried out in whole or in part by a component or components of a kite. For simplicity, method 1000 may be described generally as being carried out by a kite, such as the kite 350 and the kite 850. However, it should be understood that example methods, such as method 1000, may be carried out by other entities or combinations of entities without departing from the scope of this disclosure.

At block 1002, the method 1000 involves causing a kite to lift off the ground in a hover mode of flight. The kite may include a main wing. And the kite may be oriented vertically in the hover mode of flight. The kite may take the form of or be similar in form to the kite 101, the kite 201, the kite 350, the kite 401, the kite 501 and/or the kite 850, and the main wing may take the form of or be similar in form to the main wing 311, the main wing 352, the main wing 511, and/or the main wing 852.

At block 1004, the method 1000 involves transitioning the kite from the hover mode of flight to a crosswind mode of flight. The kite may be oriented horizontally in the crosswind mode of flight. In some embodiments, the kite may transition from the hover mode of flight to the crosswind mode of flight via forward flight and/or a flight maneuver (e.g., pitching forward).

At block 1006, the method 1000 involves controlling a roll of the kite during the crosswind mode of flight at least in part with use of two or more bridles between the kite and a tether. Each bridle of the two or more bridles may be attached to the main wing, and the two or more bridles may be adapted to provide a torque on the kite to control the roll of the kite. The two or more bridles may take the form of or be similar in form to the first bridle 362A and the second bridle 362B and/or the first bridle 862A, the second bridle 862B, and the third bridle 862C.

In some embodiments, in response to a force on the kite provided by the tether, the two or more bridles may be adapted to provide the torque on the kite to control the roll of the kite, such that the torque on the kite causes a change in the roll of the kite. Moreover, in some embodiments, causing the kite to lift off the ground in the hover mode of flight may involve controlling the roll of the kite during lift off at least in part with the use of the two or more bridles. Further, in some embodiments, the kite may further include one or more rotors attached to the main wing, wherein the one or more rotors may be adapted to provide a second torque on the kite that is substantially opposite the torque on the kite along a roll axis of the kite, and wherein in response to (i) a force on the kite provided by the tether and (ii) the second torque on the kite, the two or more bridles may be adapted to provide the torque on the kite, such that the torque on the kite causes a change in the roll of the kite. Further still, in some embodiments, the kite may further include one or more rotors attached to the main wing, wherein the one or more rotors may be adapted to provide a second torque on the kite that is substantially parallel to the torque on the kite along a roll axis of the kite, and wherein in response to a force on the kite provided by the tether, the two or more bridles may be adapted to provide the torque on the kite, such that the kite and the second torque on the kite cause a change in the roll of the kite. The one or more rotors may take the form of or be similar in form to the rotors 310, the rotors 351, and/or the rotors 851.

Moreover, in some embodiments, the main wing may include one or more control surfaces, and wherein the one or more control surfaces are adapted to provide a second torque that is substantially parallel to the torque on the kite along a roll axis of the kite, and wherein in response to a force on the kite provided by the tether, the two or more bridles are adapted to provide the torque on the kite, such that the torque on the kite and the second torque on the kite cause a change in the roll of the kite. Further, in some embodiments, the main wing may be curved, such that the main wing is adapted to provide a second torque that is substantially parallel to the torque on the kite along a roll axis of the kite, and wherein in response to a force on the kite provided by the tether, the two or more bridles may be adapted to provide the torque on the kite, such that the torque on the kite and the second torque on the kite cause a change in the roll of the kite.

Further, method 1000 may further involve controlling a roll of the kite during the hover mode of flight at least in part with the use of the two or more bridles. Further still, method 1000 may further involve landing the kite in the hover mode of flight, wherein the landing may involve controlling the roll of the kite at least in part with the use of the two or more bridles.

While various aspects of the disclosure have been disclosed herein, other aspects and embodiments will be apparent to those skilled in the art. Accordingly, the embodiments disclosed herein are for purposes of illustration, and are not intended to be limiting, with the true scope of the disclosure being indicated by the following claims.

What is claimed is:

1. A system comprising:
    a ground station;
    a tether attached to the ground station on a first end and to two or more bridles on a second end; and
    a kite comprising:
        a main wing, wherein each bridle of the two or more bridles is attached to the main wing, wherein the two or more bridles are adapted to provide a torque on the kite to control a roll of the kite, wherein the main wing comprises an axis that is perpendicular to a roll axis of the kite, and wherein the two or more bridles comprise:
            a first bridle attached to a first side of the main wing, wherein the first bridle comprises a first portion that is attached to the first side of the main wing along the axis, and
            a second bridle attached to a second side of the main wing opposite the first side of the main wing, wherein the second bridle comprises a second portion that is attached to the second side of the main wing at a location offset from the axis.

2. The system of claim 1, wherein the kite further comprises a tail wing rearward and above the main wing.

3. The system of claim 1, wherein the main wing further comprises a center line, and wherein the two or more bridles further comprise:
    a third bridle attached to a portion of the main wing, wherein the portion is located substantially on the center line of the main wing.

4. The system of claim 1, wherein in response to a force on the kite provided by the tether, the two or more bridles are adapted to provide the torque on the kite to control the roll of the kite, such that the torque causes a change in the roll of the kite.

5. The system of claim 4, wherein the force on the kite is asymmetric along the roll axis of the kite.

6. The system of claim 1, wherein the kite further comprises one or more rotors attached to the main wing, wherein the one or more rotors are adapted to provide a second torque on the kite that is substantially opposite the torque on the kite along the roll axis of the kite, and wherein in response to a force on the kite provided by the tether and the second torque on the kite provided by the one or more rotors, the two or more bridles are adapted to provide the torque on the kite, such that the torque on the kite causes a change in the roll of the kite.

7. The system of claim 6, wherein each rotor of the one or more rotors rotates in substantially the same direction.

8. The system of claim 1, wherein the kite further comprises one or more rotors attached to the main wing, wherein the one or more rotors are adapted to provide a second torque on the kite that is substantially parallel to the torque on the kite along the roll axis of the kite, and wherein in response to a force on the kite provided by the tether, the two or more bridles are adapted to provide the torque on the kite, such that the torque on the kite and the second torque on the kite cause a change in the roll of the kite.

9. The system of claim 8, wherein the torque on the kite has a magnitude that is greater than a magnitude of the second torque on the kite.

10. The system of claim 1, wherein the main wing comprises one or more control surfaces, and wherein the one or more control surfaces are adapted to provide a second torque that is substantially parallel to the torque on the kite along the roll axis of the kite, and wherein in response to a force on the kite provided by the tether, the two or more bridles are adapted to provide the torque on the kite, such that the torque on the kite and the second torque on the kite cause a change in the roll of the kite.

11. The system of claim 1, wherein the main wing is curved, such that the main wing is adapted to provide a second torque that is substantially parallel to the torque on the kite along the roll axis of the kite, and wherein in response to a force on the kite provided by the tether, the two or more bridles are adapted to provide the torque on the kite, such that the torque on the kite and the second torque on the kite cause a change in the roll of the kite.

\* \* \* \* \*